(12) United States Patent
Sturm et al.

(10) Patent No.: US 12,105,060 B2
(45) Date of Patent: Oct. 1, 2024

(54) MAGNETICALLY ACTUATED EXCITER DEVICE WITH IMPACT FUNCTION

(71) Applicant: Robert Bosch GmbH, Stuttgart (DE)

(72) Inventors: Michael Sturm, Milford, MI (US); Kevin Wienen, Farmington Hills, MI (US); Michael Yankonis, Whitmore Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 17/583,673

(22) Filed: Jan. 25, 2022

(65) Prior Publication Data

US 2023/0236100 A1 Jul. 27, 2023

(51) Int. Cl.
*G01N 3/38* (2006.01)
*G01N 3/317* (2006.01)

(52) U.S. Cl.
CPC ............... *G01N 3/38* (2013.01); *G01N 3/317* (2013.01); *G01N 2203/005* (2013.01)

(58) Field of Classification Search
CPC .......... G01N 3/34; G01N 3/38; G01N 3/2203; G01N 3/005; G01M 7/08
See application file for complete search history.

(56) References Cited

U.S. PATENT DOCUMENTS

| | | |
|---|---|---|
| 5,434,549 A | 7/1995 | Hirabayashi et al. |
| 5,884,736 A | 3/1999 | Burdisso et al. |
| 5,979,242 A | 11/1999 | Hobbs |
| 6,002,184 A | 12/1999 | Delson et al. |
| 6,105,943 A | 8/2000 | Nagasawa |
| 6,377,900 B1 | 4/2002 | Ueno et al. |
| 6,721,668 B1 | 4/2004 | Momoi et al. |

(Continued)

FOREIGN PATENT DOCUMENTS

| | | |
|---|---|---|
| DE | 102005049620 A1 | 5/2007 |
| EP | 0574574 B1 | 6/1997 |

(Continued)

OTHER PUBLICATIONS

International Search Report for Application No. PCT/EP2023/051423 dated Apr. 6, 2023 (5 pages).

(Continued)

*Primary Examiner* — Erika J. Villaluna
(74) *Attorney, Agent, or Firm* — Michael Best & Friedrich LLP

(57) ABSTRACT

An exciter device is configured to apply both a vibrational force and an impact force to a device-under-test. A first end of a piston is couplable to the device-under-test and a second end of the piston is aligned with a position of an impact hammer tip. The impact hammer tip and an electromagnet are both coupled to a moveable housing that is positioned around the piston. The exciter device applies a vibrational force to the device-under-test when an alternating magnetic field is applied by the electromagnet to the permanent magnet causing a linear reciprocating movement of the moveable housing relative to the piston. The exciter device applies an impact force to the device-under-test when a magnet field is applied by the electromagnet to the permanent magnet causing a linear movement of the moveable housing that is sufficient to cause the impact hammer to contact the second end of the piston.

17 Claims, 10 Drawing Sheets

(56) References Cited

U.S. PATENT DOCUMENTS

| | | | |
|---|---|---|---|
| 7,024,315 | B2 | 4/2006 | Giurgiutiu |
| 7,487,679 | B2 | 2/2009 | Sirrine et al. |
| 7,994,741 | B2 | 8/2011 | Delson |
| 8,281,659 | B2 | 10/2012 | Napolitano |
| 8,398,570 | B2 | 3/2013 | Mortimer et al. |
| 8,408,066 | B1 | 4/2013 | Romero et al. |
| 9,331,558 | B2 | 5/2016 | Clamme |
| 9,887,612 | B1 | 2/2018 | Eghbal |
| 10,317,373 | B2 | 6/2019 | Larkin et al. |
| 10,386,339 | B2 | 8/2019 | Zhuge et al. |
| 10,827,280 | B2 | 11/2020 | Linjama et al. |
| 11,689,251 | B1 | 6/2023 | Sturm et al. |
| 11,781,941 | B2 | 10/2023 | Sturm et al. |
| 2010/0018296 | A1* | 1/2010 | Zacny ............ E02D 1/022 73/84 |
| 2011/0239771 | A1 | 10/2011 | Wu et al. |
| 2014/0150526 | A1 | 6/2014 | Powers et al. |
| 2015/0028715 | A1 | 1/2015 | Tsuiki et al. |
| 2016/0126821 | A1 | 5/2016 | Iwaki et al. |
| 2019/0120717 | A1 | 4/2019 | Gysling et al. |
| 2019/0348894 | A1 | 11/2019 | Huang et al. |
| 2020/0232874 | A1 | 7/2020 | Underwood |
| 2021/0172829 | A1 | 6/2021 | Kim |
| 2023/0238177 | A1 | 7/2023 | Sturm et al. |
| 2023/0238867 | A1 | 7/2023 | Sturm et al. |
| 2023/0280247 | A1 | 9/2023 | Sturm et al. |

FOREIGN PATENT DOCUMENTS

| | | | |
|---|---|---|---|
| EP | 1020013 | B1 | 4/2004 |
| JP | H0593671 | A | 4/1993 |
| JP | 2013167557 | A | 8/2013 |
| KR | 20120133656 | A | 12/2012 |
| WO | 2018087067 | A1 | 5/2018 |

OTHER PUBLICATIONS

International Search Report for Application No. PCT/EP2023/051422 dated Apr. 21, 2023 (5 pages).
International Search Report for Application No. PCT/EP2023/051420 dated Apr. 25, 2023 (4 pages).
International Search Report for Application No. PCT/EP2023/051421 dated Apr. 25, 2023 (4 pages).
Beato-López et al., "A Combination of a Vibrational Electromagnetic Energy Harvester and Giant Magnetoimpedance (GMI) Sensor," Sensors, 2020, vol. 20, No. 7, 17 pages.
Van der Seijs et al., "A Robust Transfer Parth Analysis Method for Steering Gear Vibrations on a Test Bench," Proceedings of the International Conference on Noise and Vibration Engineering (ISMA), 2014, pp. 4027-4040.
International Search Report for Application No. PCT/EP2023/051418 dated Mar. 28, 2023 (5 pages).
Napolitano et al., "Multiple Sine Sweep Excitation for Ground Vibration Tests," Proceedings of the IMAC-XXVII, 2009, pp. 1753-1768.
International Search Report for Application No. PCT/EP2023/051417 dated May 2, 2023 (4 pages).
Lancea et al., "Design and additive manufacturing of brushless electric motor components," MATEC Web of Conferences, 2021, vol. 343, 6 pages.
Wrobel et al., "Additive manufacturing in construction of electrical machines—A review," IEEE Workshop on Electrical Machines Design, Control and Diagnosis (WEMDCD), 2019, vol. 1, 8 pages.
Astratini-Enache et al., "Moving Magnet Type Actuator with Ring Magnets", Journal of Electrical Engineering, vol. 61, No. 7/s, 2010, pp. 144-147.
de Klerk, "Solving the RDoF problem in experimental dynamic substructuring", Proceedings of the XXVI International Modal Analysis Conference, 2007, 9 pages.
Elliott et al., "Moment excitation and the measurement of moment mobilities", Journal of Sound and Vibration, 20112, vol. 331, pp. 2499-2519.
International Organization for Standardization, ISO 20270: 2019 Acoustics—Characterization of sources of structureborne sound and vibration—Indirect measurement of blocked forces, 2019, 47 pages.
Meggitt et al., "On the Problem of Describing the Coupling Interface Between Sub-structures: An Experimental Test for Completeness", Computer Science, Chapter 14, 2018, pp. 171-182.
Strum et al., "Robust NVH Development of Steering Systems Using In-Situ Blocked Forces from Measurements with Low-Noise Driver Simulators", NOISE-CON, 2017, 8 pages.
van der Seijs, "Experimental Dynamic Substructuring: Analysis and design strategies for vehicle development", PhD Thesis, Technical University Delft, 2016, 209 pages.
van der Seijs et al., "An Improved Methodology for the Virutal Point Transformatoin of Measured Frequency Response Functions in Dynamic Substructuring", 4th ECCOMAS Thematic Conference on Computational Methods in Structural Dynamics and Earthquake Engineering, 2013, pp. 4334-4347.

\* cited by examiner

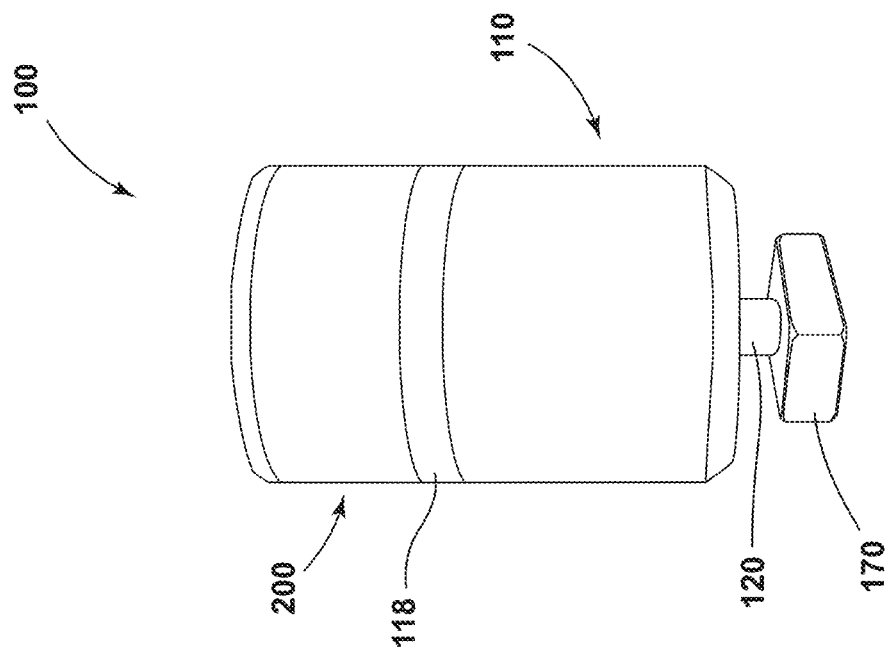
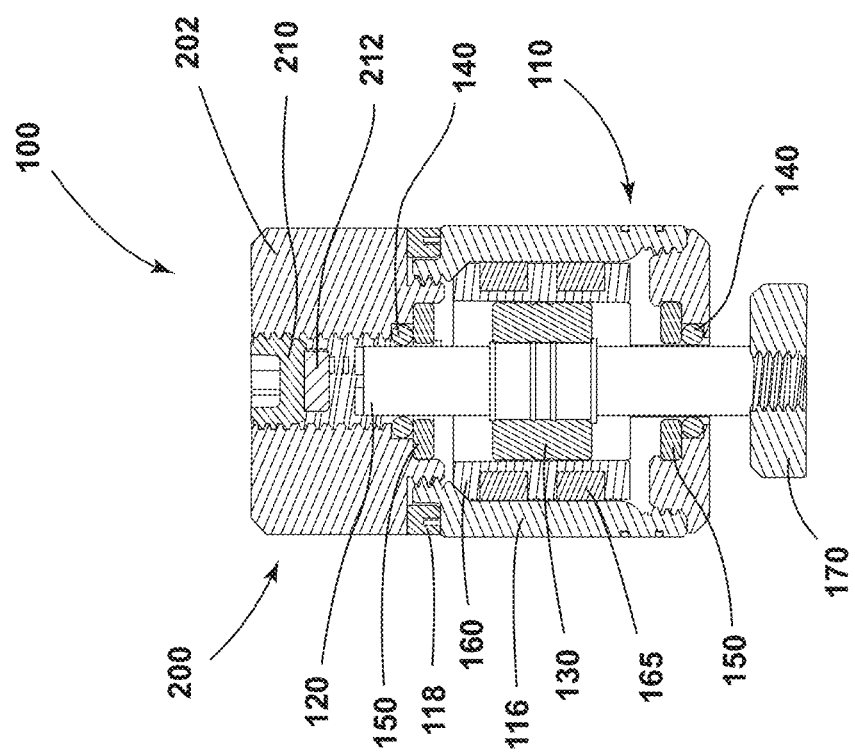
FIG. 2A
FIG. 2B

MAGNETICALLY ACTUATED EXCITER DEVICE WITH IMPACT FUNCTION

BACKGROUND

The present invention generally relates to electromagnetic devices and, more particularly, to structures for manufacturing a magnetically actuated shaker device.

SUMMARY

In one embodiment, the invention provides an exciter device including a piston, a permanent ring magnet, a moveable housing, and impact hammer, and an electromagnet. A first end of the piston is couplable to a device-under-test and a second end of the piston is aligned with a position of the impact hammer. The permanent ring magnet is fixedly coupled to the piston and the electromagnet is coupled to the moveable housing such that a magnetic field generated by the electromagnet impinges the permanent ring magnet and causes movement of the moveable housing relative to the piston. The exciter device applies a vibrational force to the device-under-test when an alternating magnetic field is applied by the electromagnet to the permanent magnet causing a linear reciprocating movement of the moveable housing relative to the piston. The exciter device applies an impact force to the device-under-test when a magnet field is applied by the electromagnet to the permanent magnet causing a linear movement of the moveable housing that is sufficient to cause the impact hammer to contact the second end of the piston.

In some implementations, the invention provides a force response testing system that includes the exciter device and an electronic controller. The electronic controller is communicatively coupled to the exciter device and is configured to generate control signals to cause the exciter device to selectively apply the vibrational force and the impact force. In some implementations, the electronic controller is configured to generate the control signals by generating an electrical current that is applied to a coil of the electromagnet.

In another embodiment, the invention provides a method for imparting a force on a device-under-test by operating the exciter device to apply a vibrational force to the device-under-test and operating the exciter device to apply an impact force to the device-under-test. The vibrational force is applied by transmitting, by an electronic controller, a first electrical signal input to the exciter device that causes the electromagnet to generate an alternating magnetic field applied to the permanent ring magnet that causes a linear reciprocating movement of the moveable housing relative to the piston. The impact force is applied by transmitting a second electrical signal input to the exciter device that causes the electromagnet to generate a magnetic field applied to the permanent ring magnet that causes a linear movement of the moveable housing sufficient to drive the impact hammer tip of the moveable housing to contact the second end of the piston.

In some embodiments, the invention provides a method of imparting an impact force to a device-under-test by transmitting an electrical signal input to an electromagnet of an exciter device that causes the electromagnet to generate a magnetic field applied to the permanent ring magnet that causes a linear movement of the moveable housing sufficient to drive a first component coupled to the piston into a second component coupled to the housing. In some embodiments, the first component is a second end of the piston and the second component is an impact hammer tip attached to the moveable housing positioned to align with the second end of the piston. In other implementations, the first component may include an impact hammer tip coupled to the second end of the piston and the second component may be a surface of the support plate of the moveable housing. In other implementations, the first component may be the permanent ring magnet coupled to the piston and the second component may be another component of the moveable housing such that, when the magnetic field is applied to the electromagnet, the impact force is generated by the magnet of the piston colliding with the other component of the moveable housing.

Other aspects of the invention will become apparent by consideration of the detailed description and accompanying drawings.

BRIEF DESCRIPTION OF THE DRAWINGS

FIG. 2A is a cross-sectional diagram of the exciter device of FIG. 1A equipped with a selectively attachable impact hammer accessory component.

FIG. 2B is a perspective view of the exciter device of FIG. 2A.

DETAILED DESCRIPTION

Figure 1B:
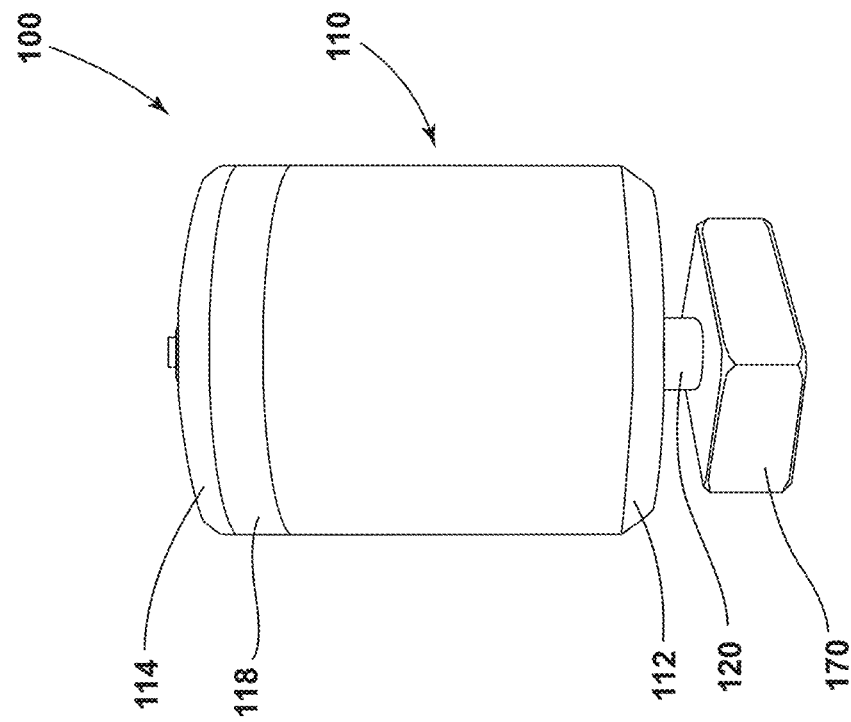
FIG. 1B is a perspective view of the exciter device of FIG. 1A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Modal testing is the process to measure structural frequency response functions (FRFs). A user is responsible for selecting the right sensors, channel coupling, frequency ranges, etc., so as to acquire the system frequency response functions with high accuracy. Various embodiments of the present invention recognize that impact hammers, single shakers, or multiple shakers can be used to excite a device-under-test (DUT) or structure-under-test (SUT). However, traditional impact hammers often are not capable of imparting sufficient energy to obtain adequate response signals in a frequency range of interest and direction of the applied force is also difficult to control. In addition, integral shaker devices are limited in the range of frequencies on device can provide to a DUT.

Embodiments of the invention provide multiple excitation modes, exact excitation position and orientation for high accuracy measurements by providing an exciter device that includes an impact hammer and contactless magnetic axial suspension, which eliminates uncertainty due to swapping of equipment. As described in further detail below, in some implementations, the magnetic axial suspension is implemented in conjunction with a zero-clearance, low-friction radial suspension. Additionally, the exciter device provides inline excitation for impact and/or continuous excitation (e.g., vibration) at points with limited access over a wide frequency range (e.g., 10-10,000 Hz), for example, by selectively switching between these two excitation modes and reassembling the frequency response function (FRF) measurements in consideration of the achieved quality in different frequency ranges.

Various embodiments of the present disclosure recognize that challenges exist in limiting movement of components in utilizing a magnetic-based system to induce vibration. Some mechanisms for limiting movement of components of an exciter device (e.g., a vibration exciter or "shaker device") during vibration may include, for example, springs, cushions, or brackets that physically block a component from moving beyond a particular displacement. However, embodiments of the invention provide a device that utilizes a first permanent ring magnet affixed to a non-magnetic table, which is positioned as the primary drive-inducing component of an excitation device, and at least one instance of a second permanent ring magnet positioned to generate repulsive force with the first permanent ring magnet to provide a magnetic axial suspension for the exciter device. The second permanent ring magnet of the magnetic axial suspension eliminates the need for the various mechanisms for limiting movement of components and allows the exciter device to be miniaturized easily, which reduces manufacturing costs. In some implementations, the contactless magnetic axial suspension is accompanied by a zero-clearance (e.g., "self-adjusting"), low-friction radial suspension providing a ring-shaped contact interface between the table/piston affixed to the device-under-test and the moving body.

Embodiments of the present inventions recognize that various challenges exist in manufacturing and assembly of structural devices using conventional machining methods. Such as, varying material properties of a solid structure cannot be achieved with conventional methods of machining. Additionally, conventional methods of machining are limited to certain shapes/geometries, such as angled channels (e.g., angled through holes for wire routing, notches, etc.), because the shapes/geometries either cannot be achieved with conventional machining methods or are so difficult and/or expensive that manufacture is impractical. Also, embodiments of the present invention recognize that conventional methods of manufacturing include tolerance and additional assembly issues.

Embodiments of the invention allow for additive manufacturing fully functioning shaker devices that include shapes and geometries that are difficult or impossible to machine using conventional methods. Additionally, the shaker devices and corresponding forces are scalable due to components of the shaker device being able to be additively manufactured except for the coil, permanent magnets, and radial guide bushings, which results in an overall reduction of the weight of the device. Also, providing customized components (e.g., piston, base, etc.) that can be designed to various complex surfaces, threaded inserts, and/or areas with limited space. Furthermore, additive manufacturing of the shaker device allows for multiple components of the device to be formed as one complex part, which avoids assembly and tolerance issues, and reduces cost related to waste material over conventional subtractive manufacturing methods. In some implementations, the use of additive manufacturing enables alternative distribution modalities. For example, in some implementations, rather than a manufacturer producing the physical device, the design files could instead be adjusted for a particular customer (e.g., re-scaling the components for a particular application) and transferred digitally to the customer who would then produce the vibration exciter device using a 3D printer thereby avoiding wait times associated with traditional production and delivery.

Also, additive manufactured techniques can be used to realize "differently tuned" vibration exciters using the same internal components (e.g., coils, magnets, o-rings, etc. as described in detail below). Slight scaling adjustments to the axial dimensions of the vibration exciter before printing can be used to adjust spacing of the same suspension and table magnets and, therefore, reducing the axial dimensions will increase the repulsive axial forces & increase stiffness of the vibration exciter, which shifts the eigenresonance to higher frequencies and makes the vibration exciter less susceptible to damage at low-frequency operation. Conversely, increasing the scale of the axial dimensions of the vibration exciter will reduce the axial repulsive forces and thus reducing axial stiffness, which results in more force output at the low-frequency range.

Figure 1A:
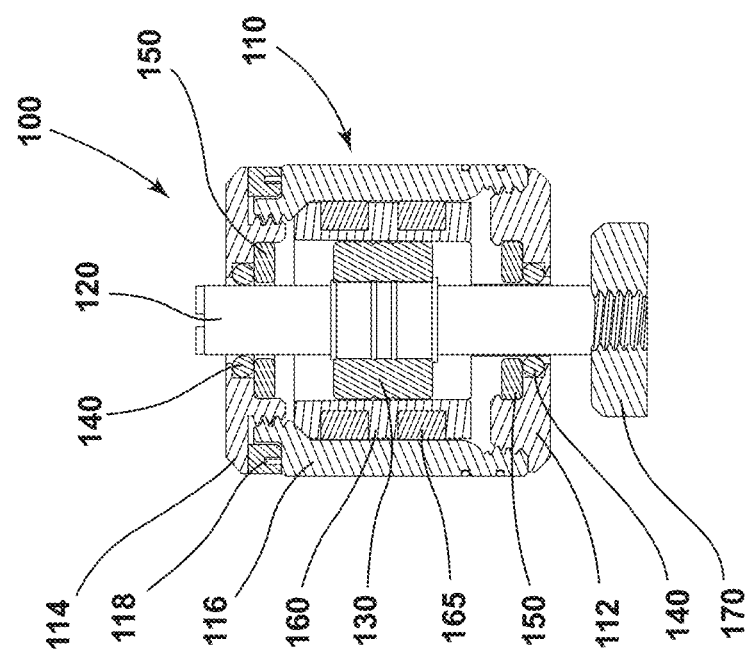
FIG. 1A is a cross-sectional diagram of a moveable housing of an exciter device (e.g., a moving body exciter device).

FIGS. 1A and 1B illustrate an example of an exciter device 100 for controllably applying a vibration force to a device/structure-under-test. As shown in FIG. 1B, the exciter device 100 (e.g., shaker device) includes a moveable housing 110 with a bottom support plate 112, a top support plate 114, a cylindrical body 116, and a mode indicator 118. As shown in FIG. 1A, the top support plate 114 and the cylindrical body 116 are formed with oppositely engaging helical structures so that the top support plate 114 is selectively couplable to the cylindrical body 116 by screw action at a first end of the cylindrical body 116. Similarly, the bottom support plate 112 and the cylindrical body 116 are also formed with oppositely engaging helical structures so that the bottom support plate 112 is selectively couplable to the cylindrical body 116 by screw action at a second end of the cylindrical body 116.

The moveable housing 110 is positioned to partially encompass a non-magnetic table 120 (e.g., piston). The bottom support plate 112 and the top support plate 114 each include an opening positioned to allow respective ends of the non-magnetic table 120 to extend from the moveable housing 110. Additionally, the mode indicator 118 is coupled to the cylindrical body 116. Also, a first end of the respective ends of the non-magnetic table 120 is coupled to a base 170, which is couplable to a device/structure-under-test. The base 170 holds the non-magnetic table stationary relative to the device/structure-under-test and, as described in further detail below, movement of the moveable housing 110 relative to the non-magnetic table 120 imparts a force on the device/structure-under-test.

A radial guide bushing 140 is positioned at both openings of the moveable housing 110. The radial guide bushing 140 is coupled to the moveable housing 110. For example, a first radial guide bushing 140 is coupled to the bottom support plate 112 of the moveable housing 110, proximate to a first end of the non-magnetic table 120. Similarly, a second radial guide bushing is coupled to the top support plate 114 proximate to a second end of the non-magnetic table 120. The radial guide bushings 140 each include a circular opening surrounding the non-magnetic table 120 and guide movement of the moveable housing 110 relative to the non-magnetic table 120. For example, the radial guide bushing 140 aligns movement of the moveable housing 110 relative to the non-magnetic table 120. In some implementations, the radial guide bushing 140 is formed of a neoprene material (e.g., a neoprene O-ring) and remains in contact with the non-magnetic table 120 during operation of the exciter device 100 as the moveable housing 110 moves relative to the non-magnetic table 120.

The radial guide bushing 140 operates as a radial suspension for the exciter device 100 and is constructed from a flexible material with a low friction coefficient between the table/piston 120 and the radial guide bushing 140. In some implementations, the compressible material of the radial guide bushing 140 exciter device 100 to eliminate clearance between the radial guide bushing 140 and the table/piston 120 when the exciter device 100 is assembled. For example, in some implementations, the final assembly of the exciter device 100 causes the radial guide bushing 140 to be compressed axially between the axial suspension ring magnet 150 and the support plate 112/114. This axial compression causes expansion of the radial guide bushing 140 in the radial direction and closes any gap that may exist between the radial guide bushing 140 and the table/piston 120.

Additionally, the axial magnetic forces applied to the axial suspension ring magnet 150 further contributes to the axial compressive force applied to the radial guide bushing 140 at both the top and bottom of the exciter device 100. This provides a radial suspension that is "self-adjusting" in that, as the permanent ring magnet 130 of the table/piston 120 approaches the axial suspension ring magnet 150 at either end of the exciter device 100, the opposing magnetic forces with cause the axial suspension ring magnet 150 to further press against the radial guide bushing 140. Accordingly, as the moveable housing 110 approaches either end of the table/piston 120, the corresponding radial guide bushing 140 further expands radial to provide an increased degree of radial stiffness between the moveable housing 110 and the table/piston 120. This increased stiffness of the radial suspension further limits the table/piston 120 from rocking and, in some implementations, may provide "zero-play" radial conditions even for higher load operations and/or to compensate for wear at the contact interface between the radial guide bushing 140 and the table/piston 120.

In some implementations, the radial guide bushing 140 is further configured to provide limited surface area contact between the radial guide bushing 140 and the table/piston 120 (e.g., an idealized "line-contact"). The reduced contact area similarly reduces friction in the axial direction. In some implementations, the radial guide bushing 140 is manufactured of a neoprene material to provide a balance between radial flexibility and axial friction coefficient. In some implementations, a silicon lubrication may also be added between the table/piston 120 and the radial guide bushing 140 to further reduce the friction between the components.

An axial suspension ring magnet 150 is also positioned at the opening of the bottom support plate 112 and a second axial suspension ring magnet is similarly positioned at the opening of the top support plate 114. In some implementations, the axial suspension ring magnet 150 is coupled to the bottom support plate 112 of the moveable housing 110 and surrounds the non-magnetic table 120. As described in further detail below, a permanent ring magnet 130 is coupled to the non-magnetic table 120 in order to drive movement of the moveable housing 110 and the axial suspension ring magnet 150 dampens movement of the moveable housing 110 relative to the non-magnetic table 120 by providing an opposing magnetic force as the permanent ring magnet 130 approaches the axial suspension ring magnet 150. The axial suspension ring magnet 150 also limits the distance the non-magnetic table 120 extends from the moveable housing 110 and prevents the portion of the non-magnetic table 120 to which the permanent ring magnet 130 is attached from extending outside of the moveable housing 110. For example, poles of the axial suspension ring magnet 150 are oriented to face like poles of the permanent ring magnet 130 affixed to the non-magnetic table 120, which produce repulsive forces that suspends the non-magnetic table 120 and prevents the non-magnetic table 120 from being ejected from the moveable housing 110. In some implementations, the axial suspension ring magnet 150 and the permanent ring magnet 130 are both permanent ring magnets composed of neodymium material.

A non-magnetic bobbin 160 is positioned within the moveable housing 110 and at least partially surrounds the non-magnetic table 120 as well as the permanent ring magnet 130 affixed thereto. The non-magnetic bobbin 160 is coupled to the cylindrical body 116 of the moveable housing 110. A coil 165 is formed around the non-magnetic bobbin 160. In the example of FIG. 1A, the coil 165 includes at least two opposing windings. The type and geometry of the windings of the coil 165 are structured to produce equivalent parameters (e.g., inductance, Q factor, insulation strength, and strength of the desired magnetic field, etc.) in the opposing windings. The coil 165 is formed of electrically conductive material (e.g., copper wire) and, when an electrical current is controllably applied to the coil 165 (as discussed in further detail below), the coil 165 operates as an electromagnet providing a controllable magnetic field. The controllable magnetic field is applied to the permanent ring magnet 130 and selectively induces movement of the moveable housing 110 relative to the permanent ring magnet 130

(and the non-magnetic table 120 to which the permanent ring magnet 130 is coupled) by controllably applying magnetic fields that attract and repel the permanent ring magnet 130. Accordingly, the moveable housing 110 is controllably moved in an upward and downward direction relative to the non-magnetic table 120 by controlling the electrical current applied to the coil 165.

In the example of FIG. 1A, the mode indicator 118 is positioned between the cylindrical body 116 and the top support plate 114. In some implementations, the mode indicator 118 is a plastic ring body with one or more light-emitting diodes positioned therein to controllably light the mode indicator 118. In some implementations, the mode indicator 118 is coupled to the cylindrical body 116 of the moveable housing 110. In other implementations, the mode indicator 118 is coupled to the top support plate 114 of the moveable housing 110. And in still other implementations, the mode indicator 118 is a separate component that is held in place between the top support plate 114 and the cylindrical body 116 of the moveable housing 110 when the top support plate 114 is selectively coupled to the cylindrical body 116 by screw action.

In the example of FIG. 1A, the mode indicator 118 indicates an operating mode of the exciter device. The mode indicator 118 may include one or more light emitting diodes (LEDs), which may vary in color to indicate the operating mode. Additionally, the mode indicator 118 may illuminate continuously or flash (e.g., power off and on) while the exciter device operates. In the example of FIG. 1A, the mode indicator 118 can be controlled based on an electric signal input (e.g., control signal of a controller, electric current of the coil 165, etc.) the exciter device receives.

As described in further detail below, the bottom support plate 112, the top support plate 114, the cylindrical body 116, and/or the mode indicator 118 of the moveable housing 110 may be manufactured via additive manufacturing (e.g., three-dimensional (3D) printing). For example, the bottom support plate 112 and the top support plate 114 may be composed of composite carbon fiber polylactic acid (PLA), the cylindrical body 116 may be composed of composite iron PLA, and the mode indicator 118 may be composed of PLA.

In some implementations, the non-magnetic table 120 may be composed of stainless steel. In some implementations, the non-magnetic table 120 and/or the base 170 may be manufactured via additive manufacturing (e.g., 3D-printing). In this example, the non-magnetic table 120 and the base 170 may be composed of composite carbon fiber polylactic acid PLA. Additionally, the base 170 may take on various shapes suitable for imparting a force of the exciter device on a device/structure-under-test (e.g., wedges for angled surfaces and/or rounded adapters for curved surfaces). In some implementations, the non-magnetic table 120 can include one or more notches configured to accommodate c-shaped washer clips as a mechanism for affixing the permanent ring magnet 130 to the non-magnetic table 120.

FIGS. 2A and 2B illustrate an example of the exciter device 100 equipped with an impact hammer accessory component 200 that is configured to controllably apply an impact force to a device/structure-under-test in addition to (or instead of) the vibrational force. As discussed above, the top support plate 114 of the moveable housing 110 in the example of FIG. 1A is selectively couplable to the cylindrical body 116 of the moveable housing 110. Accordingly, in some implementations, the top support plate 114 can be detached from the cylindrical body 116 and replaced with the impact hammer accessory component 200. As illustrated in FIG. 2A, in this example, the impact hammer accessory component 200 includes a helical structure similar to that of the top support plate 114 and is, therefore, also selectively engageable with the cylindrical body 116 by screw action. As illustrated in FIG. 2A the impact hammer accessory component 200 includes a housing 202, set screw 210, and hammer tip 212 coupled to the set screw 210. The housing 202 of the impact hammer accessory component 200 includes an opening positioned to receive the second end of the non-magnetic table 120. In the example of FIG. 2A, the set screw 210 is positioned in the opening of the housing 202 and coupled to the housing 202 of the impact hammer accessory component 200. The set screw 210 is positioned to align with the non-magnetic table 120. The set screw 210 includes the hammer tip 212. The hammer tip 212 is affixed to an end of the set screw 210 and positioned to contact a second end (e.g., the top end) of the non-magnetic table 120, as a first end of the non-magnetic table 120 is coupled to the base 170 as previously discussed. For example, instead of providing a vibrational force by applying an alternating current to the coil 165, the moveable housing 110 is configured to provide an impact force to the device/structure-under-test while the impact hammer accessory component 200 is coupled to the moveable housing 110 by applying a first control signal/current to the coil that causes the moveable housing 110 to move upward away from the surface of the device/structure-under-test. This is followed by applying an opposite current to the coil 165 that causes the moveable housing 110 to move more rapidly in an opposite/downward direction relative to the surface of the device/structure-under-test. The rapid downward movement causes the hammer tip 212 to contact the end of the non-magnetic table 120 and, thereby, imparting an impact force to the device/structure-under test through the non-magnetic table 120.

The example of FIG. 2A is just one example of an implementation configured to impart an impact force. Other configurations are possible which will also cause an impact force to be generated between the non-magnetic table 120 and either the moveable housing 110 or the impact hammer accessory component 200. For example, in some implementations, the hammer tip 210 may be affixed to the distal end of the non-magnetic table 120 and configured to impact a surface of the impact hammer accessory component 200 and/or another top support plate. In other implementations, a structure/component of the non-magnetic table 120 may be configured to impact a structure/component of the moveable housing. For example, the device may be configured such that the permanent ring magnet 130 is aligned along the vertical axis with a surface, protrusion, or top plate of the moveable housing 110 such that an impact force is generated by applying a magnetic force that causes a surface of the permanent ring magnet 130 to collide with the opposing surface/structure of the moveable housing 110.

Additionally, in some implementations, the device is configured such that elastic deformation of the impact hammer tip 212 will not corrupt the exciter measurement when used for frequency response function (FRF) testing. In some implementations, a load cell is mounted between the lower end of the non-magnetic table 120 and the based 170 (i.e., downstream of the impact tip). Accordingly, the load cell measures exactly the forces applied to the structure/device-under-test and the applied magnetic force can be adjusted to the target force. In this way, measurement uncertainty due to the elastic deformation of the hammer tip 212 is reduced or avoided entirely.

In the example of FIG. 2A, the radial guide bushing 140 is positioned in the opening of the housing 202 of the impact hammer accessory component 200. The radial guide bushing 140 is coupled to the housing 202 of the impact hammer accessory component 200. The radial guide bushing 140 encompasses the non-magnetic table 120 and guides movement of the moveable housing 110 and the housing 202 with respect to the non-magnetic table 120. Additionally, the axial suspension ring magnet 150 is positioned in the opening of the housing 202 of the impact hammer accessory component 200. The axial suspension ring magnet 150 is coupled to the housing 202 of the impact hammer accessory component 200.

The set screw 210 is formed as a cylindrical body with a helical structure on its outer surface and the housing 202 includes an opening with an oppositely formed helical structure to receive and engage the set screw 210 by screw action. In this way, the set screw 210 can be selectively coupled to and decoupled from the housing 202. In some implementations, this selective coupling allows the set screw 210 and the hammer tip 212 to be removed and replaced if the hammer tip 212 is damaged. Alternatively, in some implementations, a plurality of set screws 210 may be provided each with a different type of hammer tip 212 (material of different hardness) and, accordingly, the hammer tip 212 can be selectively interchangeable to provide a hammer tip 212 that is appropriate for a particular testing protocol.

In some implementations (e.g., as described in further detail below), the impact hammer accessory component 200 can be manufactured via additive manufacturing (e.g., 3D-printing). In some such implementations, the impact hammer accessory component 200 can be composed of composite carbon fiber PLA. Similarly, in some implementations, the set screw 210 can be manufactured via additive manufacturing (e.g., 3D-printing) and may be composed of composite carbon fiber PLA. Additionally, the hammer tip 212 may be manufactured and composed of a material with respect to the material's ability to resist permanent indentation (i.e., hardness of the material). In some implementations, the hammer tip 212 can be manufactured via additive manufacturing and may be composed of PLA, composite iron PLA, and/or composite carbon fiber PLA. In other implementations, the hammer tip 212 may be composed of stainless steel.

Figure 3:
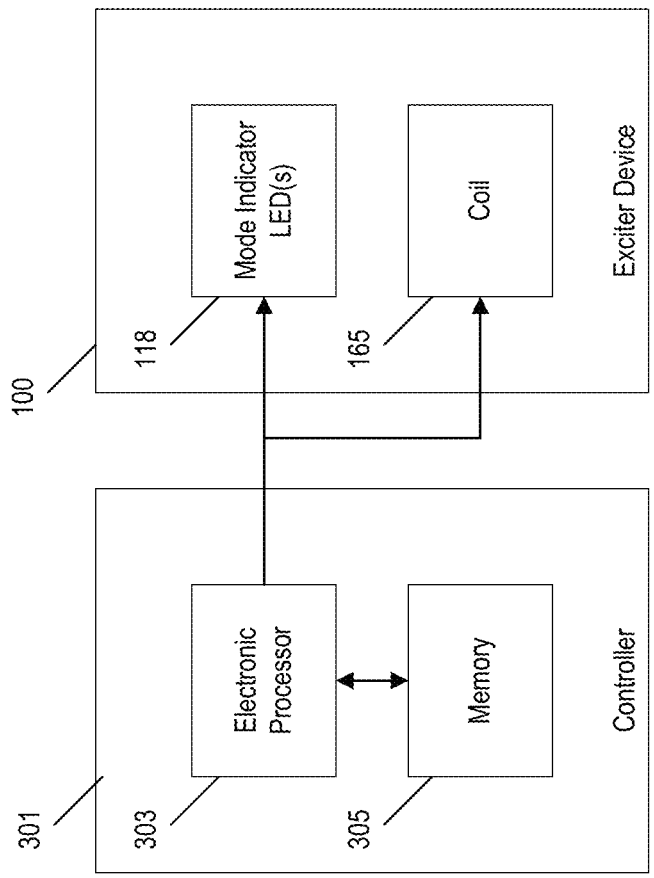
FIG. 3 is a block diagram for a control system for the exciter device of FIGS. 1A through 2B.

FIG. 3 illustrates a control system for the exciter device 100. The exciter device 100 is operated by a controller 301 to impart a force to a device/structure-under-test enabling the exciter device 100 to provide various types and scalable forces based on an input signal. Furthermore, providing consistent, reproducible, coherent measurements with no experimental uncertainty due to alternating devices.

As illustrated in the example of FIG. 3, the controller 301 includes an electronic processor 303 and a non-transitory computer-readable memory 305. The memory 305 stores data and instructions that, when executed by the electronic processor 303, provide various functionality of the controller 301 including, for example, some or all of the functionality described herein. The controller 301 is communicatively coupled to the exciter device 100.

In addition to storing computer-executable instructions, in some implementations, the memory 305 is also configured to store additional information regarding the exciter device 100, the top support plate 114, and/or the impact hammer accessory component 200 of the exciter device 100. For example, the memory 305 may be configured to store component information (e.g., location, LED functions, etc.) and performance information (e.g., operating frequencies, component constraints, targets/limits, etc.). The configuration illustrated in FIG. 3 provides but one example of the components and connections of the exciter device 100. However, these components and connections may be constructed in other ways and may include other components instead of or in addition to those illustrated in the example of FIG. 3.

In some implementations, the controller 301 is communicative coupled to the coil 165 of the exciter device 100 and is configured to provide control signals to operate the exciter device 100. For example, in some implementations, the controller 301 may be configured to transmit control signals to the coil 165 in the form of an electrical current that causes the coil 165 to produce a corresponding magnetic field that interacts with a magnetic field of the permanent ring magnet 130 of the exciter device 100, which generates movement in the moveable housing 110 of the exciter device 100 relative to the non-magnetic table 120. In this example, the controller 301 is configured to modify (e.g., alternate frequency, modify amplitude, etc.) the control signals transmitted to the coil 165 to generate a force to impart on a device/structure under test coupled to the exciter device 100.

Figure 4:
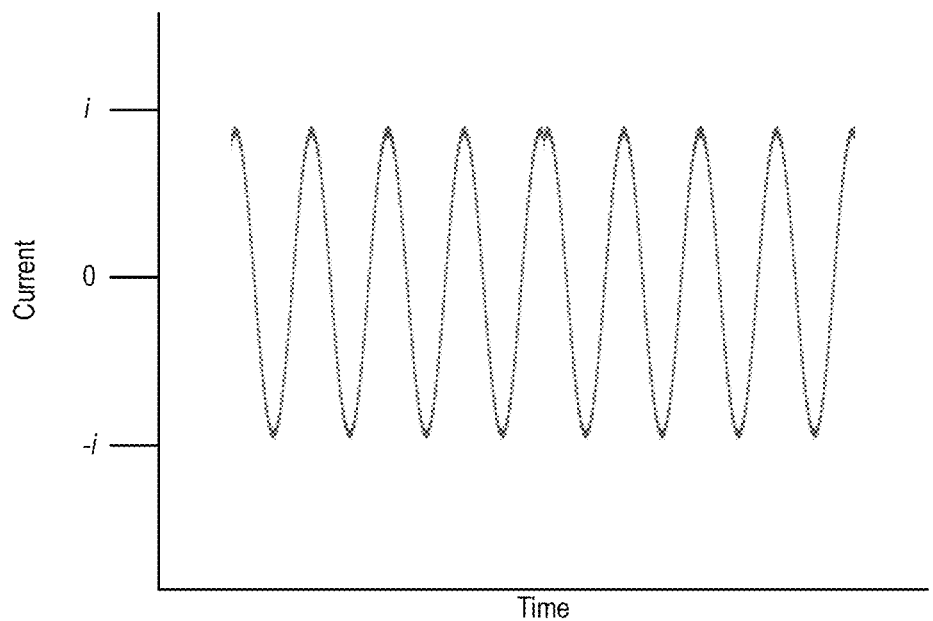
FIG. 4 is a graph of a control signal applied to the exciter device of FIGS. 1A and 1B by the control system of FIG. 3 to apply a vibrational force to the structure/device-under-test.
Figure 5:
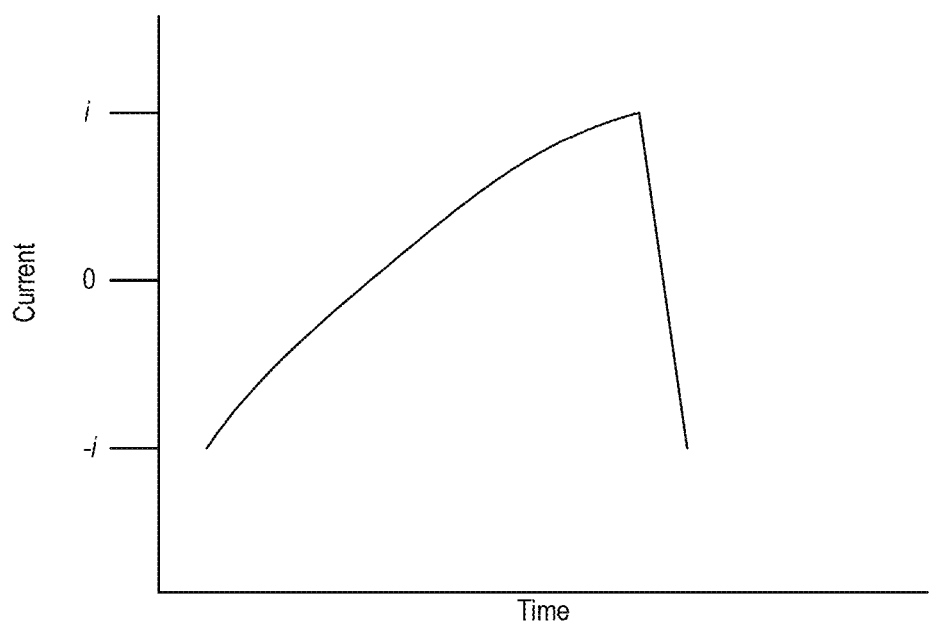
FIG. 5 is a graph of a control signal applied to the exciter device of FIGS. 2A and 2B by the control system of FIG. 3 to apply an impact force to the structure/device-under-test.

FIGS. 4 and 5 illustrate examples of control signals that may be applied by the controller 301 to the coil 165 in order to cause the exciter device 100 to generate a vibrational force and an impact force, respectively. As discussed above, the exciter device 100 is configured to induce a vibrational force in the device/structure-under-test by generating a reciprocating movement of the moveable housing 110 relative to the non-magnetic table 120. In some implementations, this is achieved by the controller 301 applying an alternating current to the coil 165, for example, as illustrated in FIG. 4. The frequency of the induced vibration can be adjusted and regulated by adjusting the frequency of the alternating current that is applied to the coil 165. Also, as discussed above, in some implementations, the coil 165 includes two oppositely configured coils. Accordingly, applying the same alternating current control signal to the coil 165 causes movement in a first direction by generating a magnetic field in a first coil that attracts the permanent magnet 130 that is coupled to the non-magnetic table while generating a magnetic field in the second coil that repels the permanent magnet 130.

In order to induce an impact force in the device/structure-under-test, the applied magnetic field must be configured to raise the moveable housing 110 relative to the surface of the device/structure-under-test and then lower the moveable housing 110 towards the surface of the device/structure-under-test at a relative high velocity. This may be achieved by applying a control signal to the coil 165 as illustrated in FIG. 5. The magnetic field induced by the gradual rising current causes the upward movement of the moveable housing 110 while the magnetic field induced by the relatively high negative slope portion of the control signal causes the relative high velocity movement in the opposite direction. This relatively high velocity downward movement of the moveable housing 110 causes the hammer tip 212 to impact the top end of the non-magnetic table 120 to impart the impact force through the non-magnetic table 120 to the device/structure-under-test. In some implementations, the exciter device 100 may be configured to apply only the impact force when equipped with the impact hammer accessory component 200 and to apply only the vibrational force when equipped with the top support plate 114. In other implementations, the exciter device 100 may be configured to selectively apply both the impact force and the vibrational force when equipped with the impact hammer accessory component 200.

Figure 6:
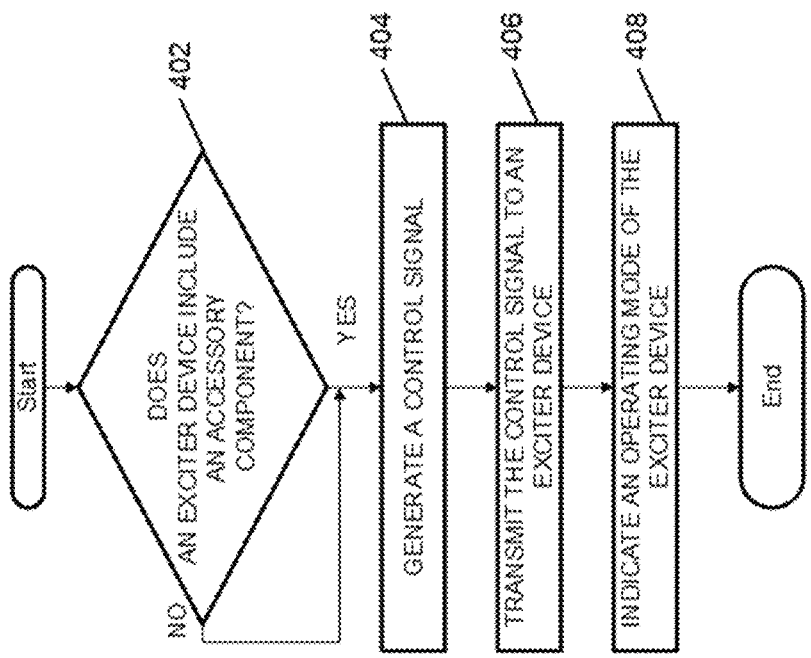
FIG. 6 is a flowchart of a method for controllably applying a force to a structure/device-under-test using the exciter device of FIGS. 1A through 2B.

FIG. 6 illustrates an example of a method performed by the controller 301 to operate the exciter device 100. In some implementations, controller 301 determines whether an exciter device include an accessory component (step 402). In the example of FIG. 6, the controller 301 determines whether the exciter device 100 includes the impact hammer accessory component 200. For example, the electronic processor 303 receives an input from a user interface of the controller 301 that indicates whether the exciter device 100 includes the impact hammer accessory component 200 or the top support plate 114. In other implementations, the exciter device 100 is configured with circuitry that automatically determines whether the impact hammer accessory component 200, the top support plate 114, or another accessory is coupled to the moveable housing 110.

If the controller 301 determines that the exciter device 100 does not include the impact hammer accessory component 200 (step 402, "NO" branch), then the controller 301 generates a control signal for the exciter device 100 to impart a vibrational force on a device/structure under test (e.g., the control signal of FIG. 4). However, if the controller 301 determines that the exciter device 100 does include the impact hammer accessory component 200 (step 402, "YES" branch), then the controller 301 generates a control signal for the exciter device 100 to impart a impact force on a device/structure under test (e.g., the control signal of FIG. 5). As noted above, in some implementations, the exciter device 100 may be configured to selectively provide the impact force and the vibrational force when equipped with the impact hammer accessory component 200. Accordingly, in some implementations, the controller 301 is configured to transmit the control signal for either the impact force or the vibration force based on a user selection or according to a predetermined testing protocol in response to determining that the impact hammer accessory component 200 is coupled to the moveable housing 110.

The controller 301 generates a control signal (step 404) for the applicable force to be applied to the device/structure-under-test and transmits the control signal to the exciter device 100. In some implementations, the controller 301 may be configured to apply the control signal to the exciter device 100 as an electrical current signal applied to the coil 165 to controllably adjust the magnetic field applied by the coil 165. In some implementations, the controller 301 utilizes the electronic processor 303 and instructions/settings stored to the memory 305 to generate a control signal for the exciter device 100. For example, the controller 301 generates an electrical signal with properties of amplitude, frequency, and wave shape. In some implementations, the controller 301 is configured to adjust the signal properties according to a testing protocol defined by a user. In some implementations, the controller 301 may include one or more signal generators such as, for example, function generators, arbitrary waveform generators, frequency generators, etc.

The control signal generated by the controller 301 is then transmitted to the exciter device 100 (step 406). In some implementations, as discussed above, the control signal is transmitted to the exciter device 100 as an electrical current applied to the coil 165 of the non-magnetic bobbin 160 of the exciter device 100. The electrical signal passes through the opposing windings of the coil 165 of the non-magnetic bobbin 160 and generates a magnetic field corresponding to the electrical signal. The coil 165 and the non-magnetic bobbin 160 are an electromagnet (e.g., solenoid), which creates an induced magnetic field concentrated at the center of the non-magnetic bobbin 160 and/or the coil 165 that corresponds to the electrical signal (e.g., electric current) passing through wire of the coil 165. Additionally, the controller 301 may modify properties of the electrical signal to influence the induced magnetic field.

In the example of FIG. 6, the base 170 and the non-magnetic table 120 of the exciter device 100 impart force of the moveable housing 110 and/or the impact hammer accessory component 200 on a device/structure-under-test. For example, the non-magnetic table 120 of the exciter device 100 to direct movement of the moveable housing 110 to the base 170 that is coupled to the device/structure-under-test. The movement of the moveable housing 110 corresponds to the interaction of the induced magnetic field of the coil 165 of the non-magnetic bobbin 160 and the magnetic field of the permanent ring magnet 130, which generate repulsive and attractive forces that induce continuous vibration in the non-magnetic table 120. In one scenario, the controller 301 transmits a control signal (e.g., electrical current) to the exciter device 100 with a waveform of a set frequency and varying polarity that induces an alternating magnetic field when passing through the coil 165 of the moveable housing 110 that interacts with the permanent ring magnet 130 of the non-magnetic table 120. In this scenario, the induced magnetic field of the coil 165 causes the moveable housing 110 to move linearly (e.g., up and down) relative to the non-magnetic table with respect to the control signal. Thus, the linear movement of the moveable housing 110 of the exciter device 100 induces a continuous oscillating vibrations in the device-under-test coupled to the non-magnetic table 120 through the base 170.

In some implementations, the base 170 and the non-magnetic table 120 of the exciter device 100 impart force of the moveable housing 110 and/or the impact hammer accessory component 200 on a device/structure-under-test. The movement of the moveable housing 110, which corresponds to the interaction of the induced magnetic field of the coil 165 of the non-magnetic bobbin 160 and the magnetic field of the permanent ring magnet 130, to cause the hammer tip 212 of the impact hammer accessory component 200 to contact a second end of the non-magnetic table 120, which is coupled to a device/structure-under-test. Thus, a force (e.g., impact force) corresponding to the contact of the second end of the non-magnetic table 120 and the hammer tip 212 of the impact hammer accessory component 200 directed to the device/structure-under-test. In some implementations, the force directed to the device/structure-under-test is measured using a load cell (force transducer) mounted between the first end of the non-magnetic table 120 and the base 170.

In some implementations of the example of FIG. 4, the above methodologies may be used alone or in combination to impart forces of the moveable housing 110 and the impact hammer accessory component 200 of the exciter device 100 on a device/structure-under-test utilizing the non-magnetic table 120. Various embodiments of the present invention provide a controllable excitation mechanism that provides the functionality of a modal hammer and integral shaker in a single exciter device. As a result, the exciter device can eliminate the need for multi-exciter setups and provide accurate and reproduceable results in impact testing.

In some implementations, the controller 301 also provides a control input to the mode indicator 118 of the exciter device 100 to indicate an operating mode of the exciter device 100 (step 408). In some implementations, the controller 301 is configured to provide a binary (i.e., on/off) signal to the mode indicator 118 to indicate only whether the exciter device 100 is operating (e.g., turning the LED light of the mode indicator 118 on when (a) a control signal current is being applied to the coil 165 and/or (b) the exciter device 100 is communicatively coupled to the controller 301). In other implementations, the controller 301 may be configured to operate the mode indicator 118 to convey other information including, for example, (1) the current operating mode (e.g., vibrational or impact), (2) active/inactive status, (3) error indications, and/or (4) location/groupings of multiple excitation devices. In some implementations, the controller 301 and the mode indicator 118 are configured to utilize various functions of LEDs of the mode indicator 118, such as illumination, intensity of illumination, flashing, various colors, etc. to indicate a status of the exciter device 100. For example, the mode indicator 118 can illuminate at a first defined intensity and/or a first color when the exciter device is providing an impact force and illuminate at a second, different defined intensity and/or a second color when the exciter device 100 is providing a vibrational force.

Figure 7:
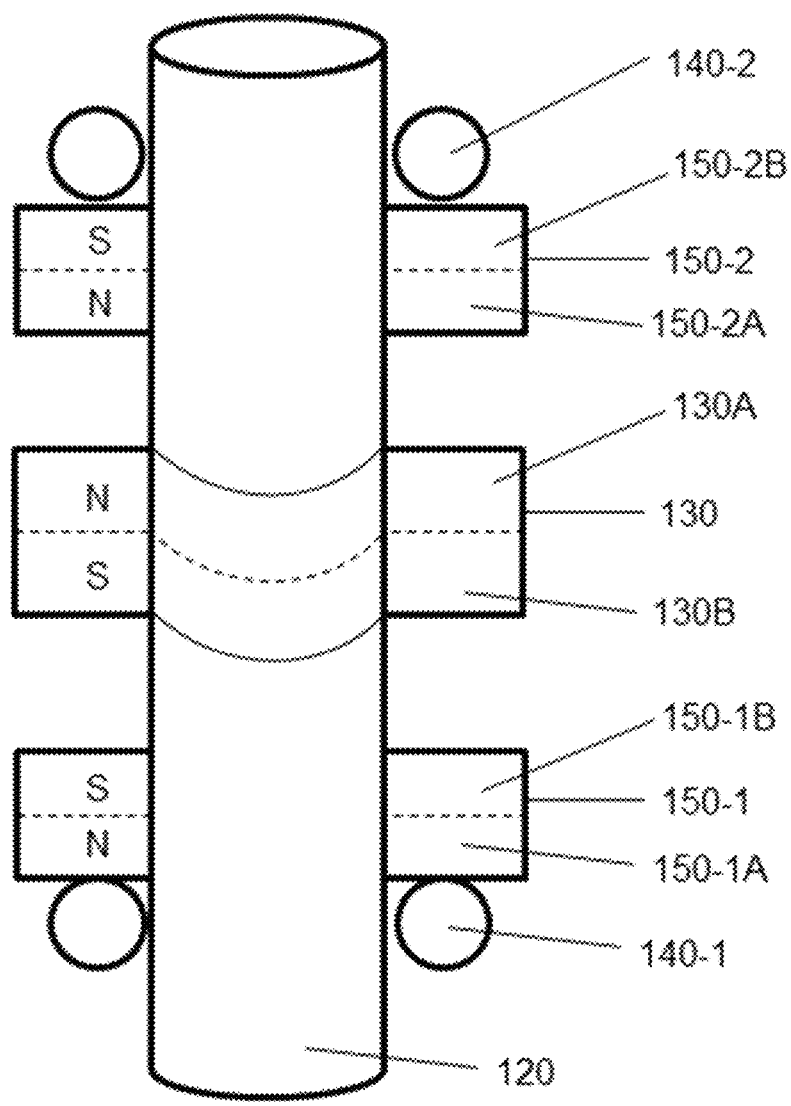
FIG. 7 is a cross-sectional diagram of the magnetic axial and radial suspension system of the exciter device of FIGS. 1A through 2B.

Accordingly, the controller 301 of FIG. 3 is operable to apply a control signal (e.g., an electrical current) to cause the coil 165 of the exciter device 100 to generate a magnetic field. This controllable magnetic field interacts with the permanent ring magnet 130 that is coupled to the non-magnetic table 120 to cause movement of the moveable housing 110 relative to the non-magnetic table 120. In some implementations, an axial and radial suspension is incorporated into the exciter device 100 to dampen linear movement of the moveable housing 110 and/or to limit movement of the moveable housing 110 to a defined extent. FIG. 7 illustrates a magnetic axial suspension and the radial suspension of the exciter device 100. The components of the axial and radial suspension of FIG. 7 are also illustrated in the examples of FIGS. 1A and 2A above, but are shown in greater detail in FIG. 7 for clarity.

As shown in FIG. 7, the axial and radial suspension of the exciter device 100 includes the permanent ring magnet 130, the radial guide bushing 140, and the axial suspension ring magnet 150. The permanent ring magnet 130 is fixedly coupled to the non-magnetic table 120. Additionally, the permanent ring magnet 130 includes at least one permanent magnet. For example, the permanent ring magnet 130 of the magnetic axial suspension may be an annularly-shaped ring magnet and axially magnetized.

The magnetic axial suspension of the exciter device 100 includes at least one instance of the axial suspension ring magnet 150. The axial suspension ring magnet 150 is positioned to surround the non-magnetic table 120 (e.g., piston). The axial and radial suspension of the exciter device 100 also includes at least one instance of the radial guide bushing 140. The radial guide bushing 140 is also positioned to surround the non-magnetic table 120 (e.g., piston). The radial guide bushing 140 guides movement of the non-magnetic table 120 (i.e., aligns movement of the non-magnetic table 120 with openings of the moveable housing 110). As described above, in some implementations, the opening of the radial guide bushing 140 is designed to provide zero-clearance between the radial guide bushing 140 and the non-magnetic table 120 (i.e., the radial guide bushing 140 is in contact with the non-magnetic table 120 around the entire circumference of the non-magnetic table 120). Additionally, in some implementations, the construction of the moveable housing 110 provides a "pre-loaded" compression of the radial guide bushing 140 in the axial direction which, in turn, causes the radial guide bushing 140 to expand in the radial direction.

In this example, the magnetic axial suspension of the exciter device 100 includes a radial guide bushing 140 and an axial suspension ring magnet 150 positioned at each end of the moveable housing 110. Accordingly, in FIG. 7, the radial guide bushing 140 and the axial suspension ring magnet 150 positioned at the bottom of the moveable housing 110 (i.e., near the opening in the bottom support plate 112) are labeled as radial guide bushing 140-1 and axial suspension ring magnet 150-1, respectively. Similarly, the radial guide bushing 140 and the axial suspension ring magnet 150 positioned at the top of the moveable housing 110 (i.e., either near the opening in the top support plate 114 or near the opening in the housing 202 of the impact hammer accessory component 200) are labeled as radial guide bushing 140-2 and axial suspension ring magnet 150-2, respectively. Each ring magnet 130, 150 includes two magnetic poles. In the example of FIG. 7, north magnetic poles are denoted with the letter A and south magnetic poles are denoted with the letter B. For example, the north magnetic pole of the permanent ring magnet 130 is labelled in FIG. 7 as 130A and the south magnetic pole of the permanent ring magnet 130 is labelled in FIG. 7 as 130B.

The functionality of the magnetic axial suspension in the example of FIG. 7 is provided by the relative arrangement of the magnetic poles of the lower axial suspension ring magnet 150-1, the upper axial suspension ring magnet 150-2, and the permanent ring magnet 130. In particular, the south magnetic pole 150-1B of the lower axial suspension ring magnet 150-1 is configured to face the south magnetic pole 130B of the permanent ring magnet 130, which results in respective magnetic fields of the permanent ring magnet 130 and the axial suspension ring magnet 150-1 interacting to generate repulsive forces. This repulsive force dampens the movement of the moveable housing 110 as the lower axial suspension ring magnet 150-1 approaches the permanent ring magnet 130 and also limits the distance that a first end of the non-magnetic table 120 can extend with respect to the lower axial suspension ring magnet 150-1. Similarly, the north magnetic pole 150-2A of the axial suspension ring magnet 150-2 is configured to face the north magnetic pole 130A of the permanent ring magnet 130, which results in respective magnetic fields of the permanent ring magnet 130 and the upper axial suspension ring magnet 150-2 interacting to generate repulsive forces. This repulsive force dampens the movement of the moveable housing 110 as the upper axial suspension ring magnet 150-2 approaches the permanent ring magnet 130 and also limits the distance that a second end of the non-magnetic table 120 can extend with respect to the upper axial suspension ring magnet 150-2. The configuration of the axial suspension ring magnets 150-2, 150-1 provides a stable equilibrium position of the permanent ring magnet 130 in the center of the bobbin.

Additionally, in some implementations, the axial and radial suspension system is configured such that the operation of the magnetic axial suspension provides further axial compression (and, in turn, corresponding radial expansion) of the radial guide bushings 140-1, 140-2. In particular, as the permanent ring magnet 130 approaches the axial suspension ring magnet 150-2, the opposing magnetic forces between the permanent ring magnet 130 and the axial suspension ring magnet 150-2 causes the axial suspension ring magnet 150-2 to apply greater axial compressing force against the radial guide bushing 140-2, which, in turn, increases the stiffness of the radial guide bushing 140-2 against the non-magnetic table 120. Conversely, as the permanent ring magnet 130 approaches the axial suspension ring magnet 150-1, the opposing magnetic forces between the permanent ring magnet and 130 the axial suspension ring magnet 150-1 causes the axial suspension ring magnet 150-1 to apply greater axial compressing force against the radial guide bushing 140-1, which, in turn, increases the stiffness of the radial guide bushing 140-1 against the non-magnetic table 120.

The combined axial and radial suspension system illustrated in FIG. 7 and as described above provides several benefits and advantages in some implementations, First, the suspension allows for the non-magnetic table 120 to be rotated 360° for screw-type coupling with a device-under-test. Also, after assembly, the moveable housing 110 can be freely rotated around the non-magnetic table 120—even while the non-magnetic table 120 is affixed to the device-under-test, which, for example, allows for more user flexibility in positioning and routing cables coupled to the exciter device 100.

FIGS. 8A through 8J illustrate an example of the exciter device 100 of FIG. 1A through FIG. 2B. In some implementations, these components of the exciter device 100 (e.g., shaker device) can be manufactured using additive manufacturing (e.g. three-dimensional (3D) printing). For example, components of the exciter device 100 are 3D printed using fused-deposition modeling with a desktop 3D printer, where the components of the exciter device 100 are created layer-by-layer by applying a melted filament through a nozzle of the desktop printer to form the components. In this example, the melted filament may be plastics with varying material properties (e.g., iron-filled metal composite Polylactic acid (PLA), black carbon fiber composite heat-treatable PLA (HTPLA), stainless steel composite metal filaments, etc.). In another example, components of the shaker device are 3D printed using fused-deposition modeling with an industrial 3D printer, where the components of the shaker device are created layer by layer by applying a melted filament through a nozzle of the industrial printer to form the components. In this example, the melted filament may be a metal (e.g., stainless steel) instead of plastic. In another example, components of the shaker device are 3D printed using selective laser sintering, also known as SLS printing, in which a laser selectively sinters the particles of a polymer or metal powder fusing them together and building components layer-by-layer In the example of FIG. 8A, a perspective view of the cylindrical body 116 is depicted. The cylindrical body 116 may be fabricated using additive manufacturing. For example, the cylindrical body 116 may be fabricated with a filament with magnetic properties to interact with the magnetic flux generated by the coil 165, for better performance (i.e., generating movement) of the exciter device 100. In another example, the cylindrical body 116 may be fabricated with metal (e.g., using an industrial printer and a metal wire) to increase the weight of cylindrical body 116. Thus, during operation when the cylindrical body 116 moves up/down with an increased dynamic mass due to the metal, and higher forces are applied to a device/structure under test. The cylindrical body 116 may include features application-specific identifiers (e.g., embossed text, delicate symbols, etc.) to locate a specific shaker device within a large array of shakers. Using conventional methods to incorporate the identifiers are difficult to achieve when machining a body using subtractive techniques. 3D-printing offers a cost-efficient solution.

In yet another example, the cylindrical body 116 may be fabricated with two or more different materials in one solid shaker body by using plastics with ferromagnetic iron particles where special magnetic properties are required and carbon fiber reinforced plastics to increase structural strength, which cannot be achieved with traditional machining. In one scenario, a central segment of the cylindrical body 116, which is proximate to the bobbin 160 and the generated magnetic field, may be composed from a magnetic material while the remaining segments of the cylindrical body 116 can be composed of non-magnetic material or carbon fiber enforced material. Also, a conductive filament can be used in fabricating the cylindrical body 116 to achieve low-cost wire terminals directly printed on the non-conductive housing of the shaker device. In yet another example, the cylindrical body 116 may include angled through holes, notches, or other types of channels, which are shapes/geometries that are difficult, impossible, and/or economically infeasible to fabricate using conventional methods.

Figure 8B:
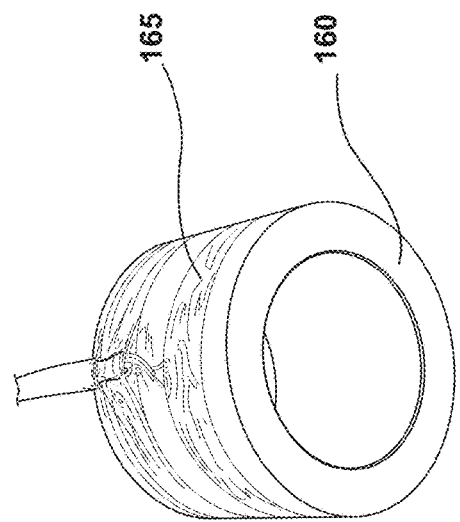
FIG. 8B is a perspective view of a bobbin of the exciter device.

In the example of FIG. 8B, a perspective view of the non-magnetic bobbin 160 that includes the coil 165 is depicted. In this example, the bobbin 160 is fabricated by additive manufacturing using a heat-resistant non-magnetic metal (e.g., brass). The coil 165 is wound on the bobbin 160 using an automated winding machine. The bobbin 160 may include one or more axial notches on a circumference of the non-magnetic bobbin 160, which can improve wire routing. Forming this bobbin 160 with the axial notches and winding the coil 165 around the bobbin 160 using traditional milling would involve additional milling steps in addition to multiple turning steps. However, using 3D printing to fabricate the bobbin 160 reduces manufacturing time, complexity, and cost.

Figure 8D:
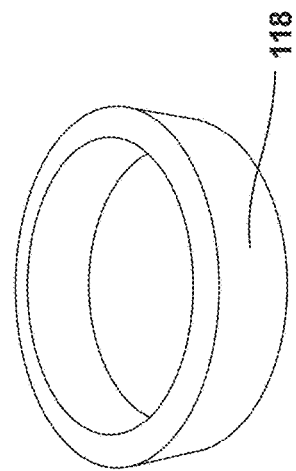
FIG. 8D is a perspective view of a mode indicator of the exciter device.
Figure 8A:
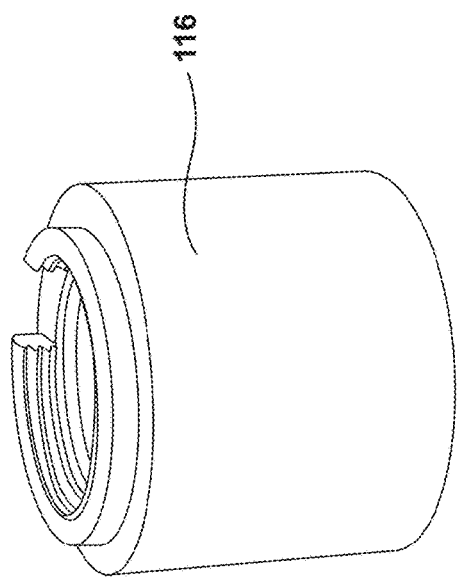
FIG. 8A is a perspective view of a cylindrical body of the exciter device.
Figure 8C:
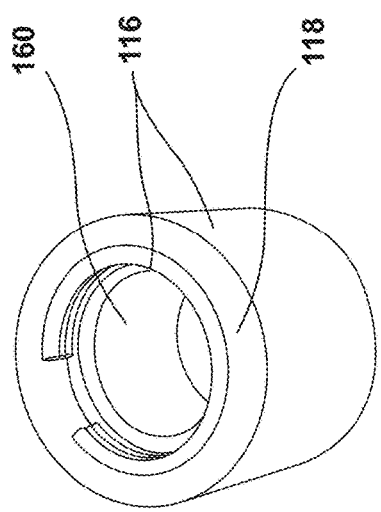
FIG. 8C is a perspective view of a bobbin assembly of FIG. 8B positioned within the cylindrical body of FIG. 8A during assembly.

The bobbin assembly (i.e., the bobbin 160 with the coil 165 wound thereon) is designed and sized to be pressed into the cylindrical body 116 as shown in FIG. 8C. The mode indicator 118 is also designed and sized to nest around a portion of the cylindrical body 116 as shown in FIG. 8C. FIG. 8D shows a perspective view of the mode indicator 118 as a separate component. In this example, the bobbin 160, the cylindrical body 116, and the mode indicator 118 are separately formed as separate components using 3D-printing and then assembled as shown in FIG. 8C. However, in some implementations, the cylindrical body 116 is 3D-printed directly around the wound bobbin 160 and/or the mode indicator 118 is 3D printed directly onto the cylindrical body 116. Directly 3D-printing components onto each other in this way avoids an additional assembly step and also eliminates tolerance issues (e.g., unwanted gaps/movement between components due to slight variations in size).

Figure 8E:
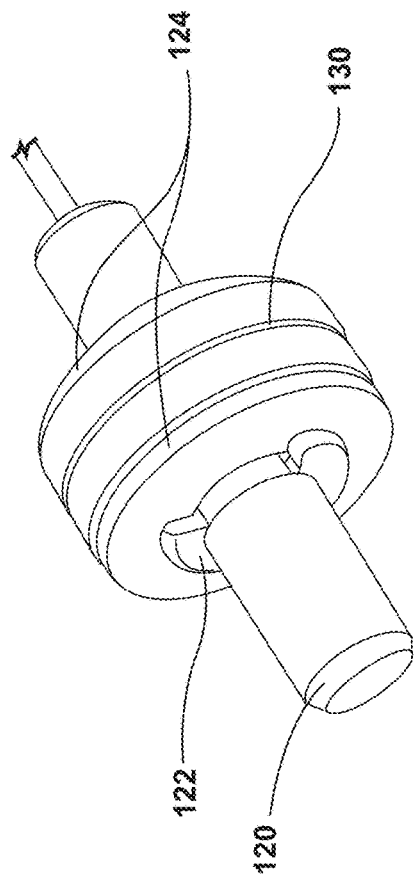
FIG. 8E is a perspective view of a table assembly of the exciter device.

FIG. 8E illustrates an example of a non-magnetic table 120 with a pair of ring magnets 130 coupled thereto. In some implementations, the table 120 is formed of an aluminum material (e.g., by machining). In other implementations, the table 120 is 3D printed using carbon fiber reinforced plastics. 3D-printing the table 120 using a material that is stiff/rigid and also lightweight allows the table 120 to transmit forces into the device/structure-under-test while also reducing static mass loading on the device/structure-under-test. Mass loading would change the structural dynamic properties of the device/structure-under-test and, therefore, excessive weight of the table 120 would cause the measured results with the exciter device 100 attached to the device/structure-under-test to differ from the actual dynamic properties of the device/structure-under-test.

As shown in FIG. 8E, multiple ring magnets 130 are positioned in series on the table 120 with opposite magnetic poles in contact such that the multiple ring magnets 130 function together as a single, larger magnet. In this example, a ferromagnetic disc 124 is positioned on opposite sides of the ring magnets 130 and operate as a retention device to affix the permanent ring magnets 130 to the table 120 (i.e., to prevent sliding and rotation of the magnets) and, in some implementations, to linearize the magnetic field at the end regions of the permanent ring magnet(s) 130 and the coils 165. In some implementations, linearization of the magnetic fields may help linearize the output force when operating the exciter device 100 at large displacements. A clip 122 (e.g., a 'c' washer) is engages a groove on the shaft of the table 120 on the outer sides of the discs 124. In other implementations, the functionality of ferromagnetic disc 124 and the c-clip illustrated in the example of FIG. 8E may be realized as one 3D-printed part.

Figure 8G:
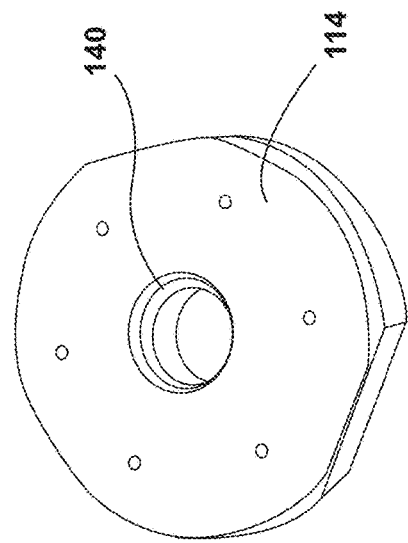
FIG. 8G is a perspective view of a radial guide bushing (i.e., a neoprene O-ring) of the exciter device.
Figure 8F:
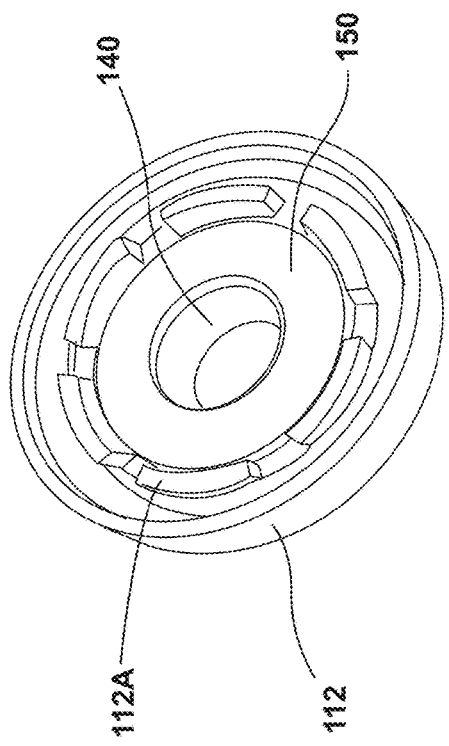
FIG. 8F is a perspective view of a bottom support plate assembly of the exciter device.

FIG. 8F provides a perspective view of the bottom support plate 112 according to one implementation. The bottom support plate 112 are formed with an integral clipping structure 112A formed concentric with the opening of the bottom support plate 112 and sized to receive both the radial guide bushing 140 and the axial suspension ring magnet 150. As shown in the example of FIG. 8F, the radial guide bushing 140 is placed in the bottom support plate 112 around the opening and the axial suspension ring magnet 150 is then placed on top of the radial guide bushing 140. The clipping structure 112A clips the axial suspension ring magnet 150 into place using pretension to couple the radial guide bushing 140 and the axial suspension ring magnet 150 to the bottom support plate 112. Due to the stacking arrangement of the axial suspension ring magnet 150 and the radial guide bushing 140 when coupled to the bottom support plate 112, the radial guide bushing 140 is not visible in FIG. 8F. However, the radial guide bushing 140 prior to assembly is illustrated in FIG. 8G.

Although the example of FIG. 8F shows the assembly of the bottom support plate 112, in some implementations, a similar clipping structure 112A is also incorporated into the top support plate 114 and/or the housing 202 of the impact hammer accessory component 200 to engage and retain a corresponding radial guide bushing and/or axial suspension ring magnet therein. The support plates 112, 114 are 3D-printed using carbon fiber enforced plastic to avoid deformations in the area of the radial guide bushing 140 and the axial suspension ring magnet 150 to increase stiffness in these high load areas of the shaker device.

Figure 8J:
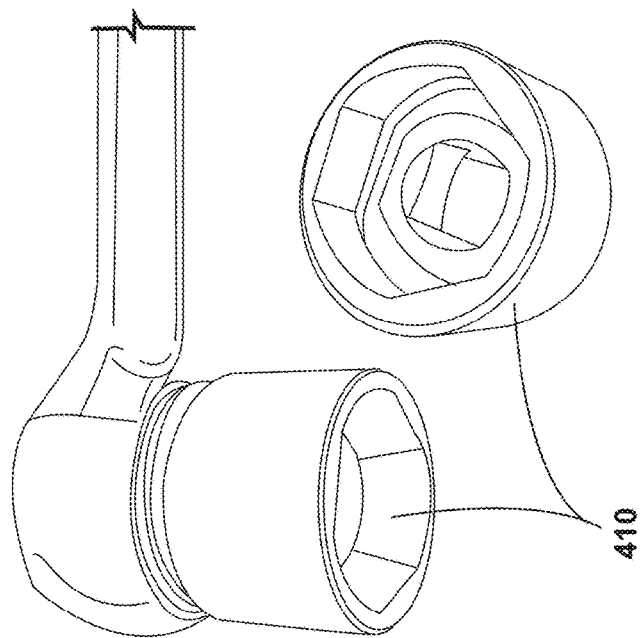
FIG. 8J is a perspective view of a key-lock tool for selectively coupling and decoupling the top support plate, the bottom support plate, and/or the impact hammer accessory component to the cylindrical body of FIG. 8A.
Figure 8H:
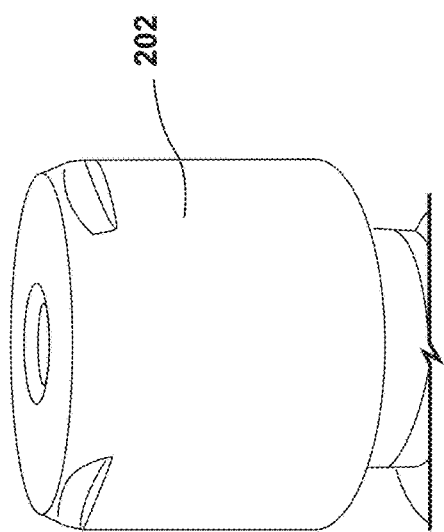
FIG. 8H is a perspective view of a housing of an impact hammer accessory component of the exciter device.
Figure 8I:
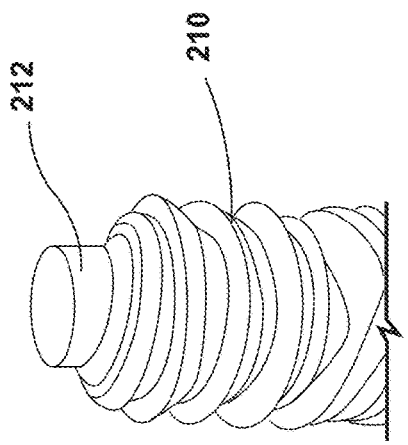
FIG. 8I is a perspective view of a hammer tip and set screw of the impact hammer accessory component of the exciter device.

FIG. 8H illustrates an example of the housing 202 of the impact hammer accessory component 200. The housing 202 may be 3D-printed using a carbon fiber PLA and/or stainless-steel material. In this example, the composition of the housing 202 may be varied based on a target weight for a specification test application (i.e., a heavier housing 202 is capable of imparting a greater impact force). FIG. 8I illustrates an example of the set screw 210 and the hammer tip 212 of the impact hammer accessory component 200. In some implementations, the set screw 210 and the hammer tip 212 are 3D-printed using a carbon fiber PLA and/or stainless-steel material. In various implementations, the set screw 210 and the hammer tip 212 may be formed of the same material or of different types of material. In some implementations, the hammer tip 212 is coupled to the set screw 210 as a separate assembly step while, in other implementations, the hammer tip 212 is 3D-printed directly onto the set screw 210. In this example, the set screw 210 is formed with a helical outer surface that is configured to engage a corresponding helical structure in a top opening of the housing 202 of the impact hammer accessory component 200 and, thereby, the set screw 210 and the hammer tip 212 are selectively couplable to the housing 202. However, in other implementations, the set screw 210 and the hammer tip 212 may be integrally formed as a part of the housing 202 of the impact hammer accessory component 200.

In the example of FIG. 8J, a perspective view of a key 410 is depicted. In some implementations, the key 410 is 3D-printed using a carbon fiber reinforced plastic material and is formed to correspond to unique shapes of the impact hammer accessory component 200, the bottom support plate 112, and/or the top support plate 114. Thus, a key-lock design of the support plates prevents the disassembly of the components without specific tools (i.e., only authorized user can modify the shaker device).

Figure 9:
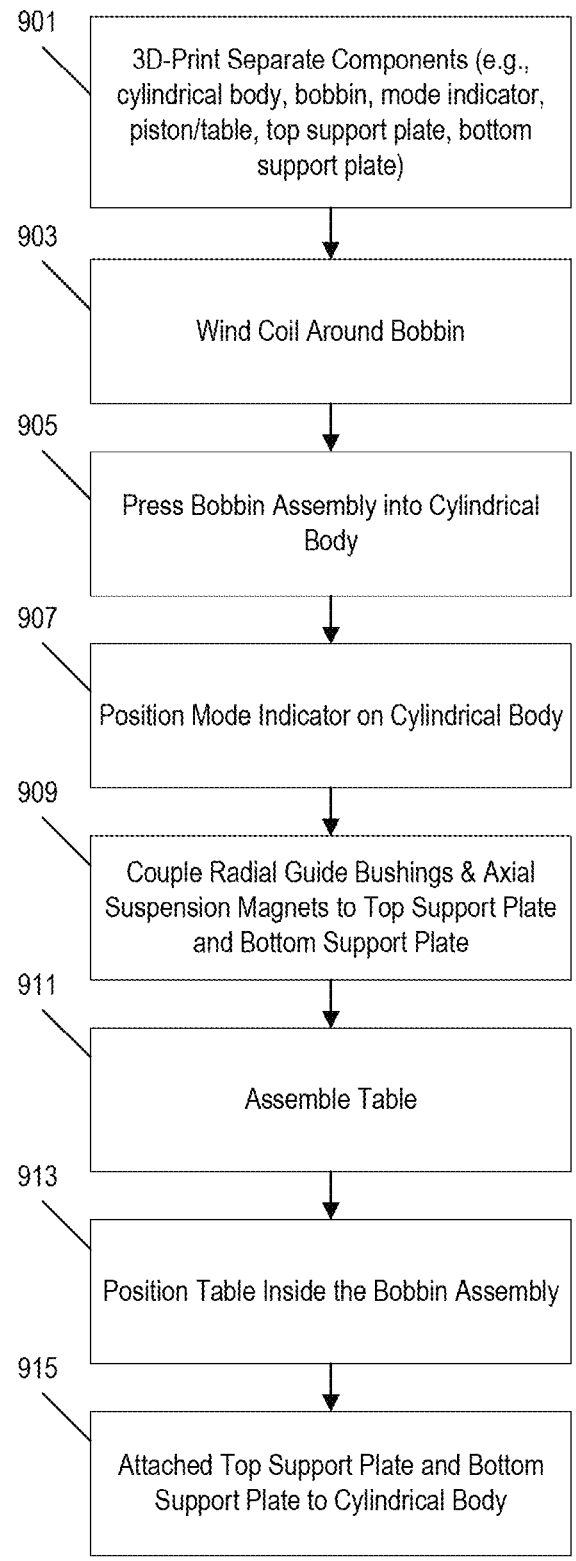
FIG. 9 is a flowchart of a method for assembling the exciter device of FIG. 1A using 3D printing.

FIG. 9 illustrates one example of a method for assembling the exciter device 100. First, the cylindrical body 116, the bobbin 160, the mode indicator 118, the top support plate 114, and the bottom support plate 112 are formed using 3D printing (as described above) (step 901). The coil 165 is wound around the bobbin 160 (step 903) and the wound bobbin is pressed into the cylindrical body 116 (step 905). The mode indicator 118 is then placed into position on the cylindrical body 116 as illustrated in FIG. 8C (step 907). The radial guide bushings 140 and the axial suspension magnets 150 are coupled to the top support plate 114 and the bottom support plate 112 as illustrated in FIG. 8F (step 909). The table assembly of FIG. 8E is then assembled (step 911) and is positioned inside the bobbin assembly (step 913). The bottom support plate 112 and the top support plate 114 are then secured into place using the key 410 (step 915).

Figure 10:
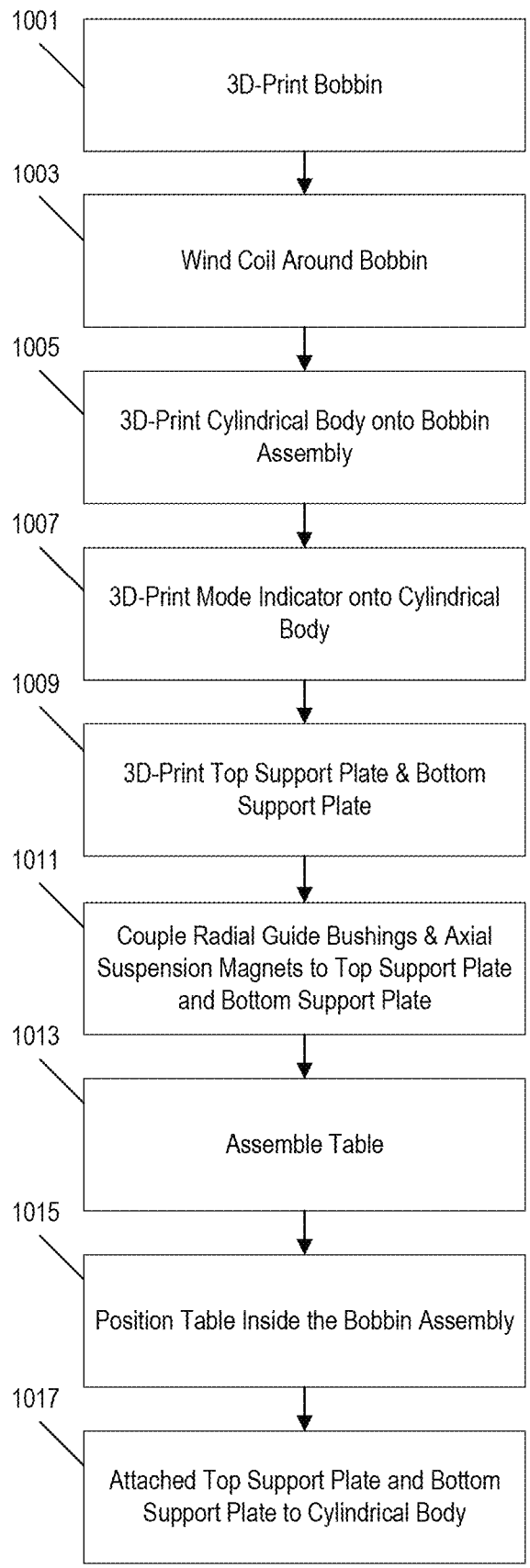
FIG. 10 is a flowchart of an alternative method for assembling the exciter device of FIG. 1A by 3D printing components directly on other components.

In the example of FIG. 9, the various components of the exciter device 100 are manufactured separately and then assembled. However, as discussed above, in some implementations, various components are formed in place by 3D-printing the component directly on another component. FIG. 10 illustrates another example of a method for assembling the exciter device 100 by 3D-printing components directly on each other. First, the bobbin 160 is 3D printed (step 1001) and the coil 165 is wound around the bobbin 160 (step 1003) as shown in FIG. 8B. The cylindrical body 116 is then 3D-printed directly onto the bobbin assembly (step 1005) and the mode indicator 118 is 3D-printed directly onto the cylindrical body 116 (step 1007). The top support plate 114 and the bottom support plate 112 are then formed using 3D printing (step 1009) and the radial guide bushings 140 and the axial suspension magnets 150 are coupled to the top support plate 114 and the bottom support plate 112 as illustrated in FIG. 8F (step 1011). The table assembly of FIG. 8E is then assembled (step 1013) and is positioned inside the bobbin assembly (step 1015). The bottom support plate 112 and the top support plate 114 are then secured into place using the key 410 (step 1017).

In some implementations of the systems and methods described above, different materials can be combined in one printed part by switching between different printing materials (e.g., using plastics with ferromagnetic iron particles where special magnetic properties are required and using carbon fiber reinforced plastics to increase structural strength). The different materials are bonded entirely through the involved printing process. This way, it is possible to achieve high strength parts with specific "local" properties. Similar varying of materials in one "solid" part cannot be achieved with traditional machining techniques. For example, in some implementations, the center part of the cylindrical body 116 (closest to the bobbin 160 and the magnetic field generated through the coil 165) is formed to include magnetic material while the remaining body (and the support plate) is formed of non-magnetic material or carbon fiber reinforced material. Also, a conductive filament can be used to achieve low cost wire terminals directly printed on the non-conductive housing of the exciter device 100 (e.g., the cylindrical body 116). Similarly, in some implementations, the set screw 210 of the impact hammer accessory component is 3D-printed from stiff carbon fiber plastic and the hammer tip 212 is 3D-printed directly on the set screw 210 using plastic materials with different elasticity.

In some implementations, the cylindrical body 116 may be 3D-printed to include angled through holes for wire routing, notches, or other types of channels required for wire guides during assembly. These shapes/geometries would be difficult (or impossible) and very expensive to machine with conventional processes.

In various implementations, the size of the exciter device 100 (and thus the output force) is scalable. For example, all parts can be printed with a scaling factor of 2 to print a larger exciter device 100 to provide a sufficient excitation for tests in commercial vehicles, trucks, and ships (i.e., an application specific "shaker"). In some implementations, most of the components of the exciter device 100 can be 3D-printed (with the exception of the ring magnets, radial guide bushing, and coil). A larger shaker with more coil windings, larger (more powerful) magnets, and a higher dynamic mass of the cylindrical body 116 can provide a higher force excitation. Similarly, a smaller shaker (scaling factor<1) can be 3D-printed, e.g. for durability tests of electronic components where access is limited. Additionally, 3D-printed parts are customizable. For example, the base 170 can be 3D-printed with a form factor that is designed to connect to curved surfaces and/or other complex geometries.

Accordingly, the examples described herein above provide, among other things, an exciter device for inducing a vibrational and/or impact force in a device/structure-under-test and mechanism for manufacturing the exciter device using 3D-printing. Further features and advantages of these systems and methods are set forth in the following claims.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

What is claimed is:

1. An exciter device, the exciter device comprising:
   a piston, wherein a first end of the piston is couplable to a surface of a device-under-test;
   a permanent ring magnet fixedly coupled to the piston;
   a moveable housing positioned around the piston, wherein the moveable housing is linearly moveable relative to the piston;
   an electromagnet coupled to the moveable housing and configured to receive an electrical signal input to generate a magnetic field impinging the permanent ring magnet,
      wherein the exciter device is configured to apply a vibrational force to the device-under-test when the electrical signal input causes the electromagnet to generate an alternating magnetic field, wherein the alternating magnetic field applied to the permanent ring magnet causes a linear reciprocating movement of the moveable housing relative to the piston, and
      wherein the exciter device is configured to apply an impact force to the device-under-test when the electrical signal input causes the electromagnet to generate a magnetic field that, when applied to the permanent ring magnet, causes a linear movement of the moveable housing sufficient to cause contact between a first location that is fixed relative to the piston and a second location that is fixed relative to the moveable housing;
   a bottom support plate with a bottom opening positioned to align with the linear movement axis of the piston such that the first end of the piston passes through the bottom opening;
   an axial suspension magnet coupled to the moveable housing proximate to the bottom opening and positioned with a magnetic polarity in opposition to a magnetic polarity of the permanent ring magnet such that opposing magnetic forces between the axial suspension magnet and the permanent ring magnet dampen movement of the moveable housing relative to the piston as the axial suspension magnet approaches the permanent ring magnet; and
   a radial guide bushing positioned proximate to the bottom opening and surrounding a circumference of the piston, wherein the radial guide bushing is formed of a flexible and compressible material and restricts radial movement of the moveable housing relative to the piston.

2. The exciter device of claim 1, further comprising an accessory component that is selectively couplable to the moveable housing, wherein the accessory component includes an impact tip positioned to align with a second end of the piston, and wherein the impact force is applied by causing the impact tip to contact the second end of the piston.

3. The exciter device of claim 2, wherein the accessory component includes:
   an accessory component housing with an opening positioned to align with the linear movement axis of the piston when the accessory component is coupled to the moveable housing;
   a set screw that is selectively couplable to the accessory component housing inside the opening; and
   the impact tip affixed to a first end of the set screw.

4. The exciter device of claim 2, wherein the accessory component includes a helical structure, wherein the moveable housing includes a corresponding helical structure, and wherein the accessory component is selectively couplable to the moveable housing by engaging the helical structure with the corresponding helical structure by screw action.

5. The exciter device of claim 2, further comprising a top support plate, wherein the top support plate is selectively and interchangeably couplable to the moveable housing in place of the accessory component, and wherein the top support plate includes an opening positioned to align with the linear movement axis of the piston when the top support plate is coupled to the moveable housing such that the second end of the piston does not contact the top support plate during movement of the moveable housing relative to the piston.

6. The exciter device of claim 2, wherein the impact tip is composed of material to resist permanent indentation.

7. A force response testing system comprising:
an exciter device including:
a piston, wherein a first end of the piston is couplable to a surface of a device-under-test;
a permanent ring magnet fixedly coupled to the piston;
a moveable housing positioned around the piston, wherein the moveable housing is linearly moveable relative to the piston;
an electromagnet coupled to the moveable housing and configured to receive an electrical signal input to generate a magnetic field impinging the permanent ring magnet,
wherein the exciter device is configured to apply a vibrational force to the device-under-test when the electrical signal input causes the electromagnet to generate an alternating magnetic field, wherein the alternating magnetic field applied to the permanent ring magnet causes a linear reciprocating movement of the moveable housing relative to the piston, and
wherein the exciter device is configured to apply an impact force to the device-under-test when the electrical signal input causes the electromagnet to generate a magnetic field that, when applied to the permanent ring magnet, causes a linear movement of the moveable housing sufficient to cause contact between a first location that is fixed relative to the piston and a second location that is fixed relative to the moveable housing; and
an electronic controller configured to
transmit a first control signal to the exciter device, wherein the first control signal is configured to cause the electromagnet of the exciter device to generate a first magnetic field that causes the moveable housing to move in a direction away from the second end of the piston, and
transmit a second control signal to the exciter device after transmitting the first control signal to the exciter device, wherein the second control signal is configured to cause the electromagnet of the exciter device to generate a second magnetic field that drives the first location that is fixed relative to the piston to contact the second location that is fixed relative to the moveable housing.

8. The force response testing system of claim 7, wherein the electronic controller is configured to transmit the first control signal and the second control signal by controllably adjusting an electronic current applied to a coil of the electromagnet.

9. The force response testing system of claim 8, wherein the electronic controller is further configured to apply an alternating electrical current to the coil of the electromagnet, wherein the alternating electrical current causes the electromagnet to generate the alternating magnetic field and apply the vibrational force to the device-under-test.

10. The force response testing system of claim 9, wherein the electronic controller is configured to regulate an amplitude and a frequency of the vibrational force applied to the device-under-test by regulating an amplitude and a frequency of the alternating electrical current applied to the coil of the electromagnet.

11. The force response testing system of claim 7, wherein the exciter device further includes a mode indicator including at least one light emitting diode, and wherein the electronic controller is further configured to transmit a mode indicator control signal to the at least one light emitting diode of the mode indicator, wherein the mode indicator control signal is configured to operate the light emitting diode to provide a visual indication of an operating mode of the exciter device.

12. A method for imparting a force on a device under test, the method comprising:
applying a vibrational force to the device-under-test by transmitting, by an electronic controller, a first electrical signal input to an exciter device, wherein the exciter device includes
a piston, wherein a first end of the piston is coupled to a surface of the device-under-test,
a permanent ring magnet fixedly coupled to the piston,
an impact tip coupled to a moveable housing and positioned to align with a second end of the piston, wherein the second end is opposite the first end, and
the moveable housing positioned around the piston, wherein the moveable housing is linearly moveable relative to the piston,
wherein the first electrical signal input is configured to cause an electromagnet to generate an alternating magnetic field applied to the permanent ring magnet that causes a linear reciprocating movement of the moveable housing relative to the piston; and
applying an impact force to the device-under-test by transmitting, by the electronic controller, a second electrical signal input to the exciter device, wherein the second electrical signal input is configured to cause the electromagnet to generate a magnetic field applied to the permanent ring magnet that causes a linear movement of the moveable housing sufficient to drive the impact tip of the moveable housing to contact the second end of the piston.

13. The method of claim 12, wherein transmitting the first electrical signal input to the exciter device includes:
generating an alternating electrical current, and applying the alternating electrical current to a coil of the electromagnet.

14. The method of claim 13, further comprising regulating an amplitude and a frequency of the vibrational force applied to the device-under-test by regulating an amplitude and a frequency of the alternating electrical current applied to the coil of the electromagnet.

15. The method of claim 12, wherein applying the impact force to the device-under-test further includes transmitting a pre-impact electrical signal input to the exciter device, wherein the pre-impact electrical signal input is configured to cause the electromagnet to generate a pre-impact magnetic field applied to the permanent ring magnet that causes a pre-impact linear movement of the moveable housing that moves the impact tip away from the second end of the piston before applying the second electrical signal input that drives the impact tip to contact the second end of the piston.

16. The method of claim 12, wherein transmitting the second electrical signal input to the exciter device includes applying an electrical current to a coil of the electromagnet, the method further comprising regulating a force magnitude of the impact force by adjusting a magnitude of the electrical current applied to the coil of the electromagnet.

17. The method of claim 12, wherein the impact tip is composed of material to resist permanent indentation.

* * * * *